Inventor:
William D. Hall,
by Harry E. Dunham
His Attorney

Jan. 30, 1940.   W. D. HALL   2,188,785

POWER-FACTOR METER

Filed Aug. 13, 1938   2 Sheets-Sheet 2

TO LINE HAVING STEAM POWER STATIONS THEREON.

Inventor:
William D. Hall,
by Harry E. Dunham
His Attorney.

Patented Jan. 30, 1940

2,188,785

UNITED STATES PATENT OFFICE 2,188,785

POWER-FACTOR METER

William D. Hall, Nahant, Mass., assignor to General Electric Company, a corporation of New York Application August 13, 1938, Serial No. 224,758

6 Claims. (Cl. 172—245)

My invention relates to power-factor meters and one object thereof is to enable 360 degree scales to be used on such meters. Another object of my invention is to provide a power-factor meter which correctly measures and indicates power-factor on a 360 degree scale, irrespective of the reversal of the connections of its single phase energizing winding. Another object of my invention is to provide a power-factor meter in which one part of the scale may be greatly expanded in comparison to another part of the same scale.

In carrying my invention into effect I multiply the angular movement of the indicating pointer as compared to the angular movement of the armature of the meter by a multiple of two, for example by two or four. While other motion multiplying ratios may be used, if it is merely desired to increase the scale distribution, they will not satisfy the requirement that the meter indicate correctly regardless of a reversal of connections. My invention concerns a power-factor meter arranged to satisfy both of these requirements. Where it is desired to expand an important part of the scale in comparison to an unimportant part thereof I purposely unbalance the polyphase field of the instrument to bring about the result desired.

Figure 1:
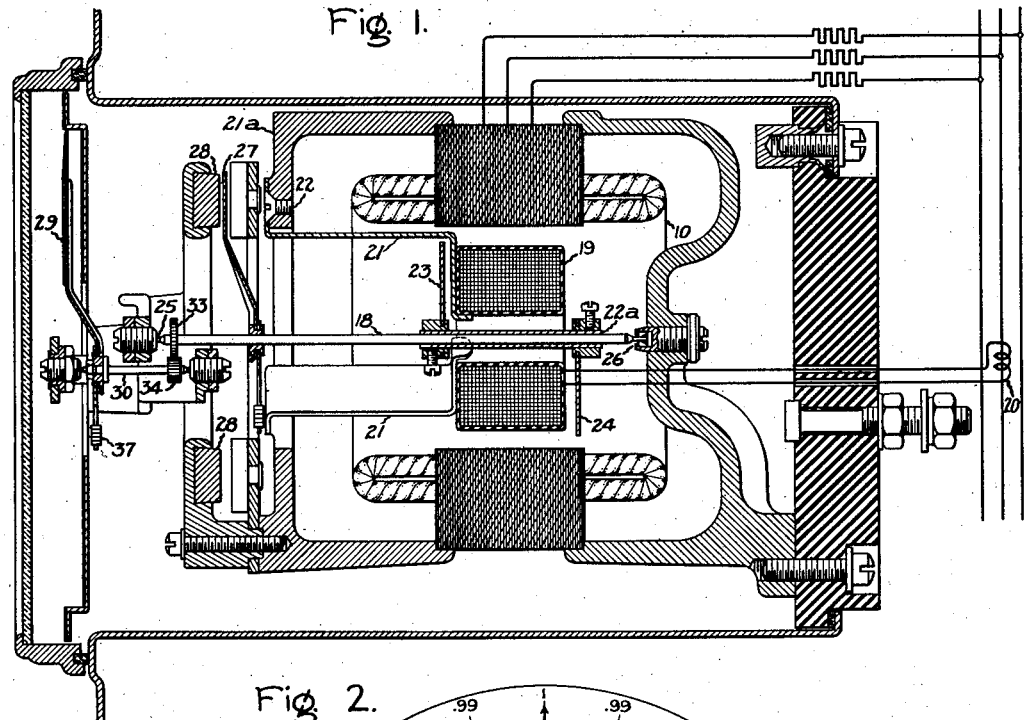
Figure 2:
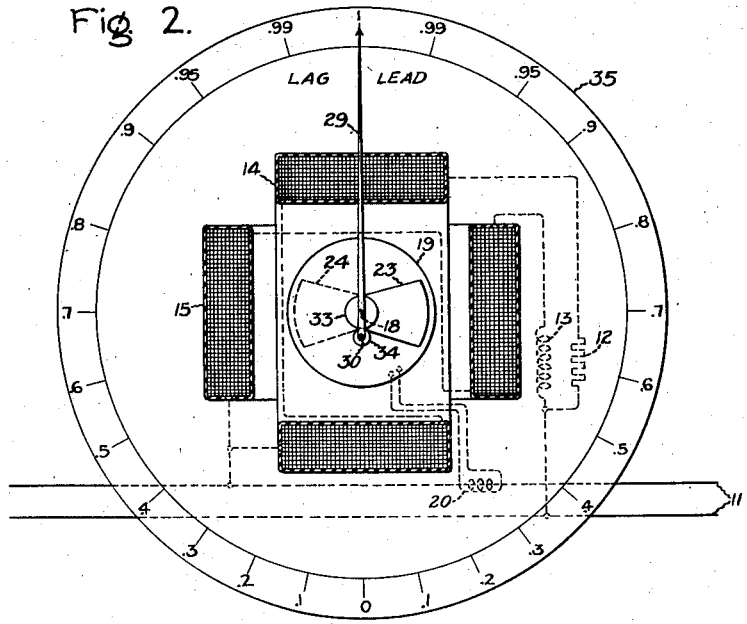
Figure 3:
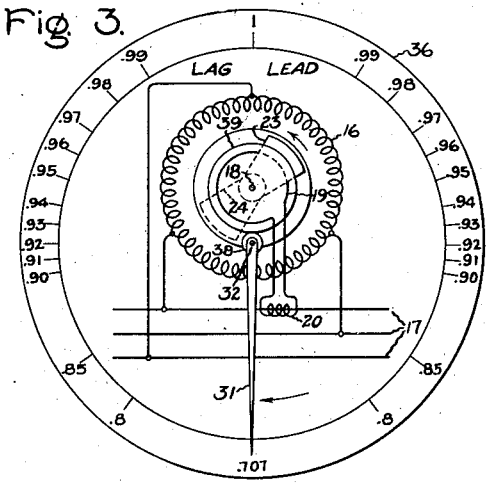
Figure 4:
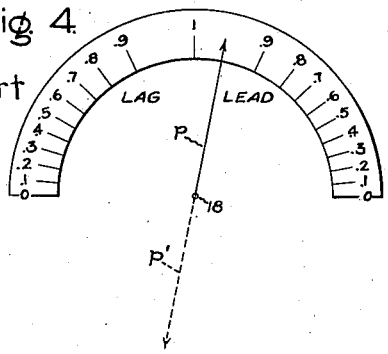
Figure 5:
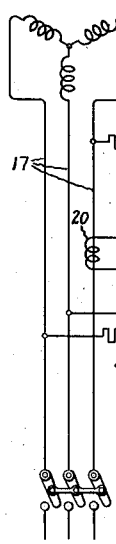
Figure 5:
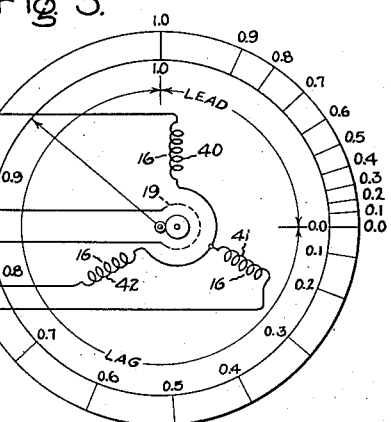

The features of my invention which are believed to be novel and patentable will be pointed out in the claims appended hereto. For a better understanding of my invention reference is made in the following description to the accompanying drawings in which Fig. 1 represents a cross-sectional view of a preferred form of power-factor meter embodying my invention. Fig. 2 is a face view of a 360 degree scale power factor meter having a two-to-one gear ratio between its moving armature and its pointer and also showing circuit connections which may be used. Fig. 3 represents a face view of a 360 degree scale power-factor meter arranged to measure power-factor between 0.707 lagging and 0.707 leading, using a four-to-one gear ratio between its armature and pointer and showing its connections to a three-phase power circuit. Fig. 4 is a power-factor scale and pointer arrangement known to the prior art which will be referred to in explaining my invention. Fig. 5 is a power-factor meter having an unbalanced polyphase field for the purpose of expanding the lag part of the scale in comparison to the lead part. Figs. 6, 7, 8 and 9 are vector diagrams pertaining to the explanation of Fig. 5.

Referring to the drawings and particularly to Figs. 1 and 2, the power-factor meter may comprise an outer polyphase winding 10 arranged to produce a two-pole, rotating, magnetic field. For use on a single phase circuit the winding 10 may comprise two coils, 14 and 15 arranged at right angles as shown in Fig. 2 and connected to the single phase lines 11 through a phase-splitting circuit including the resistance 12 and inductance 13.

For use on three-phase circuits the winding 10 of Fig. 1 may comprise a normal three-phase winding such as the winding 16 of Fig. 3 and connected to the three-phase line 17 as there indicated. This winding is energized in accordance with the voltage of the single or three-phase circuit to which it may be connected and produces a two-pole rotating magnetic field in fixed phase relation to the voltage of the power circuit. This field is in a direction at right angles to the shaft 18 of the meter.

A single phase coil 19 is also employed, connected to be energized in fixed phase relation to the current of the power circuit. A current transformer 20 may be used for this purpose as shown in Figs. 1 to 3 inclusive. The connections for Fig. 3 and Fig. 5 assume balanced conditions of the three phases of the three-phase circuit. The coil 19 is co-axial with meter shaft 18 and produces a flux along such axis. Both sets of coils 10 and 19 are stationary, being supported in any suitable manner.

In Fig. 1 coil 19 is supported by a non-magnetic skeleton frame 21 secured to the supporting casing 21a for the coil 10 by screws 22. The shaft 18 extends through coil 19 and is provided with a magnetic tube 22a within coil 19 which serves as a core therefor. At the ends of the tube and coil the shaft is provided with radially extending magnetic vanes 23 and 24. The vanes and the tube 22a are preferably made of a high permeability magnetic material having low hysteresis. These vanes are positioned about the shaft 180 degrees apart and rotate with the shaft. The shaft 18 is supported in suitable jeweled bearings 25 and 26 and is provided with a damping vane 27 which moves in the air gap of a magnetic circuit supplied with damping flux by a permanent magnet 28, whereby rotary movement of such shaft is suitably damped.

Heretofore power-factor meters of the general type described have had an indicating pointer mounted directly on shaft 18 and cooperating with a power-factor scale of the character shown in Fig. 4 and, so far as the angular movement of shaft 18 is concerned (in accordance with the difference in phase angle between the voltage and current of the power circuit) my power-factor meters of Figs. 1, 2 and 3 are similar to prior meters. The principle of such operation is as follows: the single phase coil 19 produces an alternating polarity flux in the magnetic vanes 23 and 24 in fixed phase relation with the current of the power circuit to which the meter is connected. That is, when vane 23 is a north pole, vane 24 is a south pole, and this polarity reverses at the frequency of the power circuit. Such vanes are influenced by the two-pole rotating magnetic field produced by polyphase winding 10 which rotates at the frequency of the power circuit. Thus, we have a polyphase, rotating, two-pole magnetic field and the equivalent of a two-pole, single phase, rotating magnetic field which can be assumed to rotate in the same direction. The result is that the magnetic vane armature does not rotate but takes up an angular position depending upon the phase angle between the current and voltage of the power circuit. That is, the armature will take up a position where the stator field is zero at the instant the armature field is zero and as the phase angle between current voltage varies, the armature position will vary accordingly. Hence, the angular position of shaft 18 is a measure of such angle and the cosine of such angle is the power-factor of the circuit. Hence, we may provide a pointer P on shaft 18 cooperating with a scale graduated in power-factor as indicated in Fig. 4. As the power factor of the circuit varies from 0.0 leading power-factor to 0.0 lagging power factor, the phase angle between the current and voltage varies through 180 degrees and the armature rotates through 180 degrees. With such an arrangement, the complete power-factor scale can only extend through 180 degrees, as shown in Fig. 4.

If, in Fig. 2, either the current or voltage leads be reversed without change in power-factor, it will be evident that the armature will rotate through 180 degrees, i. e., vanes 23 and 24 will change rotary positions. If the pointer be fixed to shaft 18 as in Fig. 4, the pointer will also rotate through 180 degrees and move off scale as indicated by the dotted line P'. Likewise if, as in some installations, the direction of power flow changes direction in the power circuit, which is the equivalent of reversing one set of meter leads, the armature and pointer will rotate through 180 degrees, assuming the same power-factor for power flow in the opposite directions.

According to my invention, these objectionable features of the conventional power-factor meter are avoided by omitting the pointer from shaft 18 and placing a pointer 29 on a separate shaft 30, Figs. 1 and 2, or a pointer 31 on a separate shaft 32, Fig. 3, and connecting such separate shaft to the armature shaft 18 by a driving connection having a ratio of 2/1 in Figs. 1 and 2 and 4/1 in Fig. 3. This may be accomplished by simple spur gearing. Thus in Figs. 1 and 2, I provide a gear 33 on shaft 18 in mesh with a gear 34 on shaft 30, the gear ratio being 2 to 1.

The greatly-improved power-factor scale for this arrangement is shown in Fig. 2. It extends over the 360 degree scale 35. Here, the pointer moves two mechanical degrees for each electrical degree change between current and voltage, or for each mechanical degree rotation of the armature. It is furthermore evident that if we reverse the current leads to the meter without changing the power-factor, the pointer will make a complete rotation and indicate the same power-factor. This is true whatever the power-factor may be. Thus, if the power-factor is 0.8 leading and the pointer so indicates, reversal of the current leads will simply rotate the armature 180 degrees and the pointer 360 degrees to return to the same indication. Similarly if the load feeds current back into the line, the device indicates the correct power-factor. The pointer never goes off scale. It is only certain gear ratios that will accomplish this important result. For example, a gear ratio of three-to-one does not produce the desired result since then a reversal of the armature would result in 3×180 degree rotation of the pointer, or 540 degrees, equivalent to 540−360=180 degrees error in pointer deflection.

However, a 4/1 ratio or a 6/1 ratio or any even multiple of the 2/1 ratio will be satisfactory, but the ratio to use in any given case will depend upon the range of power factor variation for which the meter is intended and the degree of clearness desired of the scale calibration over such range. Fig. 3 shows the scale calibration for a four-to-one gear ratio, the gears being designated by 39 and 38. While the full 360 degree scale length is utilized, the scale 36 is calibrated between the range of 0.707 leading to 0.707 lagging power-factor and this would make a very clear reading meter for circuits in which the power-factor does not go below 0.707.

In Fig. 3 it is assumed that the power-factor is unity when the armature vanes extend in a horizontal line and that the armature rotates counterclockwise for leading power-factor variations. It will be noted that the armature has rotated 45 degrees in a counterclockwise direction from the unity power-factor position and that the pointer has rotated 180 degrees in a clockwise direction to indicate cos 45°=0.707 or the power-factor. If, now, the current leads to coil 19 be reversed, the armature 23 will rotate 180 degrees and the pointer will make two complete revolutions and hence will still indicate correctly. This particular meter provides for variation in phase angle between current and voltage over a range of 90 degrees and, while the center of this range corresponds to unity power-factor, it might correspond to any other power factor simply by replacing the scale shown by another scale graduated over some other 90 degree range and repositioning the pointer 31 on shaft 32, if it was desired to keep the center of the scale in the upright position.

It may be noted that the scale of Fig. 3 has slightly greater than ten times the clearness of the scale of Fig. 4 over its upper half. By this I mean that it is slightly easier to read the power-factor graduations .99, .98, .97, etc. on the scale of Fig. 3 than it is to read the graduations .9, .8, .7, etc. on the scale of Fig. 4, assuming such scales were the same size.

The gearing between the armature and pointer shafts should be accurately made and nicely fitted or otherwise adapted to eliminate back lash. It is required to transmit very little torque and if the pointer shaft 30 is nicely balanced as by the balance 37, Fig. 1, this torque is constant in all positions. However, I do not wish to limit my invention to the use of gearing between armature and pointer.

I may retain the 360 degree power-factor scale with the advantage of being able to reverse the single phase leads without changing the indication and at the same time distort the scale distribution to any desired extent so as to greatly expand that portion of the scale which is most important and correspondingly contract another portion of the scale which is of the least importance. Such a meter is represented in Fig. 5. Here, the lag part of the scale covers about 270 degrees of the scale and the lead part covers the remaining portion of the 360 degree scale. The manner in which this is accomplished is to provide an unbalanced, as distinguished from a balanced, polyphase field in the meter. In Fig. 5 it is assumed that the three-phase power circuit 17 is balanced. The polyphase field winding of the meter comprises three similar coils 40, 41 and 42 uniformly spaced and connected in Y to the power circuit and hence responds to the phase of the voltage of such circuit. The circuit leads to coils 40 and 41 contain resistances 43 and 44 while the lead to coil 42 contains no resistance. This merely indicates one way of obtaining an unbalanced polyphase field. To obtain an unbalance sufficient to produce the distorted scale distribution represented in Fig. 5 by way of example, I may use 2450 ohms resistors at 43 and 44 with 200 ohms reactance each in coils 40, 41 and 42, 50 ohms of the 200 in each coil being inductive reactance for 60 cycle meters. The relative magnitude and phase relation of the voltage currents in the coils 40, 41 and 42 may be pictured as in Fig. 6 where 0A, 0B and 0C represent the voltage currents in coils 42, 40 and 41 respectively.

Figure 6:
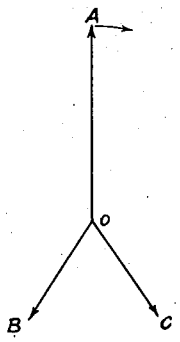
Figure 7:
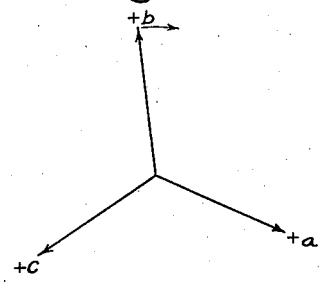
Figure 8:
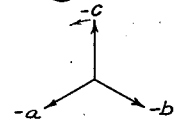
Figure 9:
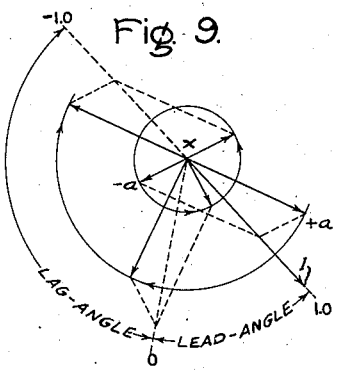

By applying the principle of symmetrical components, the vector relation of Fig. 6 may be resolved into positive sequence components, Fig. 7, and negative sequence components, Fig. 8. In Fig. 9 $x-a$ represents the value of negative sequence component rotating counterclockwise and $x+a$ the value of positive sequence component rotating clockwise taken from Figs. 7 and 8, where these components are slightly more than 120 degrees apart, which angle of separation is correct at the unity power factor condition of the meter. At unity power-factor the resultant of the positive and negative sequence components will be in phase with the current in the current coil 19 of the meter. This resultant lies along the line from $x$ to 1.0 and I have drawn the current vector I along this line to indicate the unity power-factor condition and the magnetic vane armature of the meter will aline with the axis $x$ 1.0 at unity power factor; hence the designation 1.0.

Now let us assume a condition of zero power-factor where the current leads the E. M. F. by 90 degrees. To simplify the vector diagram of Fig. 9, I will assume the current vector remains stationary and the voltage vectors are rotated 90 degrees. The negative sequence component vector $-a$ is rotated 90 degrees counterclockwise and the positive sequence component vector $+a$ is rotated 90 degrees clockwise, as indicated, so that their resultant lies along the line $x$, 0. The magnetic vane armature of the meter will now aline itself with the axis $x$, 0 at zero power-factor when the current and voltage vectors of the line, not the meter, are 90 degrees out of phase. The angle between $x$, 1.0 and $x$, 0 is then the angle of lag of the armature of the meter between zero and unity power-factor. Other positions of the armature within this angle can be arrived at in the same way by assuming different lag power-factor angles between zero and 90 degrees.

Now let us assume that the current still further leads the E. M. F. beyond 0% power-factor leading which then makes a lagging power-factor to the next cycle of the E. M. F. and we continue this shift by another 90 degrees through the complete lag angle. This is the equivalent of reversing the voltage field completely when the power-factor stays at unity and which reverses the position of the vane armature 180 degrees. Thus, shifting the positive and negative sequence components another 90 degrees gives us a resultant along the line designated $x$, $-1.0$ and the angle between X, 0 and $x$, $-1.0$ is then the angle of lag of the armature. Various positions of the armature within this angle can be arrived at by assuming different lag angles within the 90 degree shift just described. If the meter is provided with a pointer connected directly with the armature, its complete scale will extend over 180 degrees and its lead portion will be approximately 45 degrees and its lag portion about 135 degrees. Other scale distributions than this can be obtained by taking other conditions of voltage flux unbalance. For example, by taking a smaller degree of voltage field unbalance in the same direction, the lead and lag scale portions will be more nearly equal and by taking a greater degree of voltage field unbalance in the same direction, the distortion will be made greater. Now, by connecting the armature to the pointer by a two-to-one gear ratio or its equivalent, the leading and lagging scale distribution angles are doubled and the complete scale extends 360 degrees, as shown in Fig. 5. Reversing of the current coil leads without changing the power-factor reverses the armature 180 degrees and the pointer 360 degrees and does not change the power-factor indications. If it is desired to make the lead portion of the scale greater than the lag portion, this may be done by reversing the direction of phase rotation of the voltage field of the meter. Also, if it is desired to use any 180 degree portion of the scale shown in Fig. 5 and expand it over 360 degrees, this may be done by using a four-to-one gear ratio as explained in connection with Fig. 3.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A power-factor meter having a stationary polyphase winding for producing a two-pole rotating magnetic field, a two-pole magnetic vane armature rotatively mounted within the influence of said field, a single phase winding for magnetizing said armature, connections for energizing said windings in fixed phase relations with the voltage and current respectively of a power circuit, a pointer connected in driving relation with said armature such that the pointer turns through an angle which is some multiple of two times the angle through which the armature turns and a 360 degree power-factor scale with which said pointer cooperates to indicate power-factor.

2. In a power-factor meter, a scale having graduations to designate values of power-factor, a pointer pivoted to rotate relative to said scale and indicate thereon, and driving means for said pointer comprising a pair of windings, and connections for energizing said windings in accordance with the voltages and current of an alternating current power circuit, said driving means including rotary means responsive to the phase difference of the currents of said windings for rotating said pointer two angular degrees for each electrical degree change in such phase relationship.

3. In a power-factor meter, a scale, a pointer pivoted to rotate relative to said scale and to indicate thereon, a pair of windings, connections for energizing said windings in accordance with the phase relation between the voltage and current in a power circuit, and rotary means responsive to the phase difference between the currents in said windings for rotating said pointer four angular degrees for each electrical degree change in said phase relationship, said scale having graduations extending over 360 degrees thereof on which said pointer indicates such phase relationship in terms of power-factor.

4. A power-factor meter comprising a three-phase winding and a single phase winding, connections for energizing said windings in accordance with the voltage and current of a power circuit the power-factor of which it is desired to measure, means for causing the field produced by the three-phase winding to be unbalanced, a magnetic vane armature mounted for rotation within the influence of the fields produced by said field windings and which is rotatively responsive to the phase relation between the currents in said windings and the distortion in the three-phase field caused by its unbalance, a pointer connected to be rotated by said armature in proportion to the armature rotation, and a scale over which said pointer moves, said scale being graduated so that the position of the pointer thereon indicates in terms of power-factor the phase relation between the energizing currents of said two windings, the graduations on a portion of the scale being expanded with respect to another portion so as to conform to the modification in the rotary movement of said armature which is due to the unbalance of the three-phase field.

5. A power-factor meter comprising a stationary three-phase winding, a magnetic vane armature rotatively mounted within the influence of the field produced by said three-phase winding, a single phase winding for magnetizing said armature, connections for energizing said windings in accordance with the voltage and current of a circuit the power-factor of which is to be measured, means for unbalancing the field produced by said three-phase winding whereby the rotary position of said armature depends upon the power-factor to be measured and the distortion of the three-phase field due to unbalance, a 360 degree power-factor scale, a pointer cooperating with said scale and connected in driving relation with said armature so as to rotate $2x$ mechanical degrees for each mechanical degree rotation of said armature, "$x$" being an integer, said power-factor scale having expanded and contracted portions to conform to the modification in the rotary movement of said armature with changes in power-factor which are due to the unbalance of said three-phase field.

6. A phase relation indicating device having a pair of windings for producing two rotating magnetic fields, at least one of said windings being of a type that produces a polyphase field, a rotary armature member within the influence of said fields and responsive to the phase difference between the currents with which said windings are energized, connections for supplying said windings with currents the phase difference of which it is desired to indicate, a scale, a pointer pivoted for rotation to indicate on said scale, and a driving connection between said armature and pointer of a driving ratio such that the pointer rotates 360 degrees when one of said fields is reversed to shift the phase relation between said fields by 180 electrical degrees and cause a corresponding rotation of the armature.

WILLIAM D. HALL.